US008572663B2

(12) United States Patent
Anderson et al.

(10) Patent No.: US 8,572,663 B2
(45) Date of Patent: *Oct. 29, 2013

(54) AUTOMATICALLY CONFIGURING A WEB-ENABLED PORTABLE DEVICE TO ACCESS THE INTERNET

(75) Inventors: Eric C. Anderson, Gardnerville, NV (US); Robert P. Morris, Raleigh, NC (US)

(73) Assignee: KDL Scan Designs LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/183,566

(22) Filed: Jul. 15, 2011

(65) Prior Publication Data
US 2011/0271000 A1 Nov. 3, 2011

Related U.S. Application Data

(63) Continuation of application No. 12/212,113, filed on Sep. 17, 2008, now Pat. No. 8,009,194, which is a continuation of application No. 10/658,999, filed on Sep. 9, 2003, now Pat. No. 7,443,419, which is a continuation of application No. 09/625,824, filed on Jul. 26, 2000, now Pat. No. 6,636,259.

(51) Int. Cl.
*H04N 5/232* (2006.01)
*H04N 7/18* (2006.01)
(52) U.S. Cl.
USPC ......... 725/105; 348/211.3; 348/143; 348/156
(58) Field of Classification Search
USPC .......... 725/105; 348/211.3, 211.12, 143, 156, 348/157
See application file for complete search history.

(56) References Cited

U.S. PATENT DOCUMENTS 4,847,694 A 7/1989 Nishihara
5,206,915 A 4/1993 Kern
(Continued)

FOREIGN PATENT DOCUMENTS

EP 930770 7/1999
EP 0930770 7/1999
(Continued)

OTHER PUBLICATIONS

Pan, L., "A Digital Camera With a Function of Picture Transmission," Database EPODOC, European Patent Office, XP001091526 [TW 403853B (Inventec Corp) Sep. 1, 2000].
(Continued)

*Primary Examiner* — Hung Lam
(74) *Attorney, Agent, or Firm* — Stolowitz Ford Cowger LLP

(57) ABSTRACT

Automatically configuring a portable electronic device for accessing a site on a public network is disclosed. The method and system include establishing a connection to at least one server for establishing and maintaining website accounts, and sending information uniquely identifying the electronic device to the at least one server. The at least one server sends user account information to the device, including an account ID and password, created based on the electronic device information. The user account information is stored on the device for use the next time the device accesses the website, whereby the user does not have to enter account information in order to establish the ISP connection or the website account before accessing the public network or, if the user account is not completely set up, to establish the user account a next time the device connects to the at least one server.

16 Claims, 6 Drawing Sheets

(56) References Cited

U.S. PATENT DOCUMENTS

| | | |
|---|---|---|
| 5,249,230 A | 9/1993 | Mihm |
| 5,333,133 A | 7/1994 | Andrews et al. |
| 5,396,546 A | 3/1995 | Remillard et al. |
| 5,430,827 A | 7/1995 | Rissanen |
| 5,432,871 A | 7/1995 | Novik |
| 5,442,749 A | 8/1995 | Northcutt et al. |
| 5,444,483 A | 8/1995 | Maeda |
| 5,446,491 A | 8/1995 | Shibata |
| 5,469,453 A | 11/1995 | Glider et al. |
| 5,475,441 A | 12/1995 | Parulski et al. |
| 5,477,264 A | 12/1995 | Sarbadhikari et al. |
| 5,477,542 A | 12/1995 | Takahara et al. |
| 5,524,194 A | 6/1996 | Chida et al. |
| 5,532,833 A | 7/1996 | Hong et al. |
| 5,552,776 A | 9/1996 | Wade et al. |
| 5,558,148 A | 9/1996 | Uzaki et al. |
| 5,568,192 A | 10/1996 | Hannah |
| 5,577,107 A | 11/1996 | Inagaki |
| 5,594,736 A | 1/1997 | Tatsumi et al. |
| 5,606,365 A | 2/1997 | Maurinus et al. |
| 5,608,874 A | 3/1997 | Ogawa et al. |
| 5,625,410 A | 4/1997 | Washino et al. |
| 5,649,185 A | 7/1997 | Antognini et al. |
| 5,659,742 A | 8/1997 | Beattie et al. |
| 5,666,159 A | 9/1997 | Parulski et al. |
| 5,674,003 A | 10/1997 | Anderson |
| 5,677,909 A | 10/1997 | Heide |
| 5,684,918 A | 11/1997 | Abecassis |
| 5,696,850 A | 12/1997 | Parulski et al. |
| 5,719,786 A | 2/1998 | Nelson et al. |
| 5,737,491 A | 4/1998 | Allen et al. |
| 5,739,864 A | 4/1998 | Copeland |
| 5,748,780 A | 5/1998 | Stolfo |
| 5,754,227 A | 5/1998 | Fukuoka |
| 5,768,426 A | 6/1998 | Rhoads |
| 5,771,355 A | 6/1998 | Kuzma |
| 5,784,581 A | 7/1998 | Hannah |
| 5,790,789 A | 8/1998 | Suarez |
| 5,790,807 A | 8/1998 | Fischler et al. |
| 5,793,966 A | 8/1998 | Amstein et al. |
| 5,799,150 A | 8/1998 | Hamilton et al. |
| 5,799,322 A | 8/1998 | Mosher, Jr. |
| 5,806,005 A | 9/1998 | Hull et al. |
| 5,812,989 A | 9/1998 | Witt et al. |
| 5,814,798 A | 9/1998 | Zancho |
| 5,821,523 A | 10/1998 | Bunte et al. |
| 5,822,524 A | 10/1998 | Chen et al. |
| 5,825,408 A | 10/1998 | Yuyama et al. |
| 5,832,514 A | 11/1998 | Norin et al. |
| 5,835,140 A | 11/1998 | Nakamura et al. |
| 5,845,265 A | 12/1998 | Woolston |
| 5,852,472 A | 12/1998 | Prasad et al. |
| 5,860,068 A | 1/1999 | Cook |
| 5,862,217 A | 1/1999 | Steinberg et al. |
| 5,862,218 A | 1/1999 | Steinberg |
| 5,862,325 A | 1/1999 | Reed |
| 5,884,042 A | 3/1999 | Winter et al. |
| 5,896,128 A | 4/1999 | Boyer |
| 5,905,528 A | 5/1999 | Kodama |
| 5,905,736 A | 5/1999 | Ronen et al. |
| 5,917,542 A | 6/1999 | Moghadam et al. |
| 5,926,623 A | 7/1999 | Tsukakoshi et al. |
| 5,943,046 A | 8/1999 | Cave et al. |
| 5,973,731 A | 10/1999 | Schwab |
| 5,991,842 A | 11/1999 | Takayama |
| 5,999,968 A | 12/1999 | Tsuda |
| 6,002,770 A | 12/1999 | Tomka et al. |
| 6,006,039 A | 12/1999 | Steinberg et al. |
| 6,012,088 A | 1/2000 | Li et al. |
| 6,017,157 A | 1/2000 | Garfinkle et al. |
| 6,035,323 A | 3/2000 | Narayen et al. |
| 6,038,295 A | 3/2000 | Mattes |
| 6,046,762 A | 4/2000 | Sonesh et al. |
| 6,049,621 A | 4/2000 | Jain et al. |
| 6,052,509 A | 4/2000 | Abe |
| 6,064,671 A | 5/2000 | Killian |
| 6,067,571 A | 5/2000 | Igarashi et al. |
| 6,069,648 A | 5/2000 | Suso et al. |
| 6,073,192 A | 6/2000 | Clapp et al. |
| 6,073,241 A | 6/2000 | Rosenberg et al. |
| 6,076,109 A | 6/2000 | Kikinis |
| 6,147,742 A | 11/2000 | Bell et al. |
| 6,167,469 A | 12/2000 | Safai et al. |
| 6,185,551 B1 | 2/2001 | Birrell et al. |
| 6,185,611 B1 | 2/2001 | Waldo et al. |
| 6,204,877 B1 | 3/2001 | Kiyokawa |
| 6,223,190 B1 | 4/2001 | Aihara et al. |
| 6,226,752 B1 | 5/2001 | Gupta et al. |
| 6,230,187 B1 | 5/2001 | Suzuki |
| 6,266,082 B1 | 7/2001 | Yonezawa et al. |
| 6,269,481 B1 | 7/2001 | Perlman et al. |
| 6,281,874 B1 | 8/2001 | Sivan et al. |
| 6,301,586 B1 | 10/2001 | Yang et al. |
| 6,301,607 B2 | 10/2001 | Barraclough et al. |
| 6,332,146 B1 | 12/2001 | Jebens |
| 6,337,712 B1 | 1/2002 | Shiota |
| 6,430,470 B1 | 8/2002 | Nakajima et al. |
| 6,445,777 B1* | 9/2002 | Clark ................... 379/88.13 |
| 6,453,361 B1 | 9/2002 | Morris |
| 6,480,671 B2 | 11/2002 | Takahasi et al. |
| 6,502,195 B1 | 12/2002 | Colvin |
| 6,529,522 B1 | 3/2003 | Ito et al. |
| 6,538,663 B2 | 3/2003 | Kamei |
| 6,567,121 B1 | 5/2003 | Kuno |
| 6,567,122 B1 | 5/2003 | Anderson et al. |
| 6,571,271 B1 | 5/2003 | Savitzky et al. |
| 6,573,927 B2 | 6/2003 | Parulski et al. |
| 6,581,094 B1 | 6/2003 | Gao |
| 6,583,799 B1 | 6/2003 | Manolis et al. |
| 6,591,295 B1 | 7/2003 | Diamond et al. |
| 6,608,973 B2 | 8/2003 | Masera |
| 6,623,528 B1 | 9/2003 | Squilla |
| 6,625,812 B2 | 9/2003 | Abrams et al. |
| 6,628,325 B1 | 9/2003 | Steinberg et al. |
| 6,636,259 B1 | 10/2003 | Anderson et al. |
| 6,647,409 B1 | 11/2003 | Sherman et al. |
| 6,650,831 B1 | 11/2003 | Thompson |
| 6,657,702 B1 | 12/2003 | Chui et al. |
| 6,701,522 B1 | 3/2004 | Rubin et al. |
| 6,715,003 B1 | 3/2004 | Safai et al. |
| 6,762,791 B1 | 7/2004 | Schuetzle |
| 6,784,924 B2 | 8/2004 | Ward et al. |
| 6,832,101 B1 | 12/2004 | Kino |
| 6,909,889 B2 | 6/2005 | Ishikawa |
| 6,930,709 B1 | 8/2005 | Creamer et al. |
| 7,117,519 B1 | 10/2006 | Anderson et al. |
| 7,173,651 B1 | 2/2007 | Knowles |
| 7,287,088 B1 | 10/2007 | Anderson |
| 7,444,373 B2 | 10/2008 | Ludwig et al. |
| 7,483,964 B1 | 1/2009 | Jackson et al. |
| 7,587,514 B2 | 9/2009 | Anderson |
| 8,009,194 B2 | 8/2011 | Anderson |
| 8,073,965 B2 | 12/2011 | Anderson |
| 2001/0010543 A1 | 8/2001 | Ward et al. |
| 2001/0043272 A1 | 11/2001 | Sato et al. |
| 2002/0054224 A1 | 5/2002 | Wasula et al. |
| 2002/0083171 A1 | 6/2002 | Hoogenboom et al. |
| 2002/0087601 A1 | 7/2002 | Anderson et al. |
| 2002/0101816 A1 | 8/2002 | Braitberg et al. |
| 2003/0191756 A1 | 10/2003 | Oh |
| 2004/0174440 A1 | 9/2004 | Kojima et al. |
| 2005/0246752 A1 | 11/2005 | Liwerant et al. |
| 2006/0062192 A1* | 3/2006 | Payne ................... 370/338 |

FOREIGN PATENT DOCUMENTS

| | | |
|---|---|---|
| EP | 1948883.2 | 7/2008 |
| JP | 2002-514560 | 2/2004 |
| WO | 9921336 | 4/1999 |
| WO | WO 99/21336 | 4/1999 |
| WO | 9948276 | 9/1999 |
| WO | WO 99/48276 | 9/1999 |

(56) References Cited

FOREIGN PATENT DOCUMENTS

| WO | 0208860 | 1/2002 |
|---|---|---|
| WO | 0208926 | 1/2002 |
| WO | 0209435 | 1/2002 |

OTHER PUBLICATIONS

JP 2000047988 (Tozono) Jul. 28, 1998 (abstract) [online] Retrieved from the PAJ database.
JP 09233453 Canon Inc.) Sep. 5, 1997 (abstract) [online] Retrieved from the PAJ database.
JP 10105517 (Takasaki) Apr. 24, 1998 (abstract) [online] Retrieved from the PAJ database.
JP 11-265390 Hoshina; Sep. 28, 1999 (abstract) (online) Retrieved from the PAJ database.
JP 2003-111008 Satomi Apr. 11, 2003; (abstract) (online) Retrieved from the PAJ database.
JP 2004-032129 Fukuda Jan. 29, 2004; (abstract) (online) Retrieved from the PAJ database.
United States Patent and Trademark Office ISA/IPEA; PCT/US2001/021488 International Preliminary Examination Report; Jun. 23, 2003; 3 pages.
United States Patent and Trademark Office ISA/IPEA; PCT/US2001/23112 International Preliminary Examination Report; May 17, 2002; 3 pages.
United States Patent and Trademark Office ISA/IPEA; PCT/US2001/041089 International Preliminary Examination Report; Sep. 9, 2004; 4 pages.
Stolowitz Ford Cowger LLP Related Case Listing; Mar. 12, 2012; 2 Pages.
Digby Keane; "High Speed Communications for Robots" Department of Computer Science and Electrical Engineering University of Queensland; Oct. 15, 1999; 97 Pages.
Corcoran et al.; "Internet enabled digital photography"; Consumer Electronics, IEEE Transactions; Aug. 1999; vol. 45 Issue 3; pp. 577-583.
Recene, Ronald; Investigation into the use of the World Wide Web as an interface for distributing electronic documents to and from a remote digital color printing site; 1996; https://ritmdl.rit.edu/handle/1850/60.
Stolowitz Ford Cowger LLP Related Case Listing; Corrected—Jul. 11, 2013; 2 Pages.

* cited by examiner

AUTOMATICALLY CONFIGURING A WEB-ENABLED PORTABLE DEVICE TO ACCESS THE INTERNET

CROSS-REFERENCE TO RELATED APPLICATIONS

The present application is a continuation of U.S. patent application Ser. No. 12/212,113, filed Sep. 17, 2008, now issued as U.S. Pat. No. 8,009,194, which is a continuation of U.S. patent application Ser. No. 10/658,999, filed Sep. 9, 2003, now issued as U.S. Pat. No. 7,443,419, which is a continuation of U.S. patent application Ser. No. 09/625,824, filed Jul. 26, 2000, now issued as U.S. Pat. No. 6,636,259, all of which are hereby incorporated by reference in their entireties. The present invention is related to co-pending U.S. patent application Ser. No. 09/625,398 entitled "Method and System For Hosting Entity-Specific Photo-Sharing Websites For Entity-Specific Digital Cameras," and to U.S. Pat. No. 7,117,519, entitled "Method And System For Selecting Actions To Be Taken By A Server When Uploading Images," which are assigned to the assignee of the present application.

BACKGROUND

As the popularity of digital cameras grows, the desire of digital camera users to share their images with others will also continue to grow. New digital camera owners typically try to share their images based on the paradigm of film cameras, in which images are printed on paper and then placed into a photo album. The most straightforward approach to do this with a digital camera is to connect the digital camera directly to a printer to create the prints, and then manually insert the images into a photo album. Users often find this process somewhat complicated restrictive because standard printers can only print images in limited sizes and requires particular types of paper. And even after the photo album has been assembled, the printed images are not easily shared with many people.

The best approaches to photo-sharing take advantage of the Internet. One such approach is for users to store the digital images on a personal computer (PC) and then send the images to others using email. Several Internet companies now offer an even more convenient approach by providing photo-sharing websites that allow users to store their images for free and to arrange the images into web-based photo albums. Once posted on a photo-sharing website, others may view the images over the Internet.

While convenient for storing digital images, getting the images to the photo-sharing websites can be challenging for users. Most commonly, users must upload their images from the digital camera to a PC using a cable or Infrared Data Association (IrDA), or by inserting the camera's flash card into the PC. From the PC, the user logs onto the Internet and uploads the images to a photo-sharing website. After uploading the images, the user works on the website to arrange the images into web albums and to add any textual information.

Although today's approach for storing images from a digital camera onto a web photo-sharing website and for creating web photo albums works reasonably well, two problems remain that hinder the mainstream adoption of web-based photo-sharing. One problem is that this approach requires the use of a PC, notebook computer, or personal data assistant (PDA). While many digital camera users today have PC's, most of those users are early adopters of technology. There are many other consumers who would purchase a digital camera, but are reluctant to do so because they do not yet own a PC or are intimidated by them.

In an effort to address this problem, the assignee of the present application developed an approach to uploading images to the web that doesn't require the use of a PC. In this approach, an email software application is loaded into a digital camera capable of running software that allows the user to e-mail the images directly from the camera. The user simply connects his or her digital camera to a cellphone or modem, runs the e-mail application, and selects the desired images and the email recipients. The selected images are then sent to the recipients as e-mail attachments.

Although emailing photos directly from the camera allows users who do not own a PC to share images over the Internet, these users must still establish accounts with both an Internet service provider (ISP) and the photo-sharing website before being able to post their images. These accounts must also be set-up by PC users as well. For techno savvy users who use a PC to upload the images to the photo-sharing website, establishing the accounts may not be a bother, but even these users may not always have their PCs handy, such as when on vacation, for instance. And for non-PC users, establishing the accounts by entering account information on the digital camera itself may prove to be a cumbersome, if not a daunting, task.

Accordingly, what is needed is an improved method for uploading images from a digital camera to a photo-sharing website on the Internet. In order for online photo-sharing to become more mainstream, an approach that doesn't require a PC or PC expertise and that reduces complexity for the user is required. The present invention addresses such a need.

SUMMARY OF THE INVENTION

The present invention provides a method and system for automatically configuring a hand-held portable electronic device for accessing a site on a public network is disclosed. The method and system include establishing a connection to at least one website server, which is responsible for establishing and maintaining website accounts, and sending information uniquely identifying the electronic device to the at least one website server. The electronic device receives user account information from the at least one server, including an account ID and password, created based on the electronic device information. The user account information is then stored on electronic device for use the next time the electronic device accesses the website, whereby the user does not have to enter account information in order to establish the ISP connection or the website account before accessing the public network, or if the user account is not completely set up, to establish the user account a next time the portable device connects to the at least one server.

According to the method and system disclosed herein, a user does not have to enter account information in order to establish the ISP connection or the website account before accessing the public network with the electronic device.

DETAILED DESCRIPTION

The present invention relates to an automatic system for uploading images from a digital camera to entity-specific photo-sharing websites and for automatically establishing accounts. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
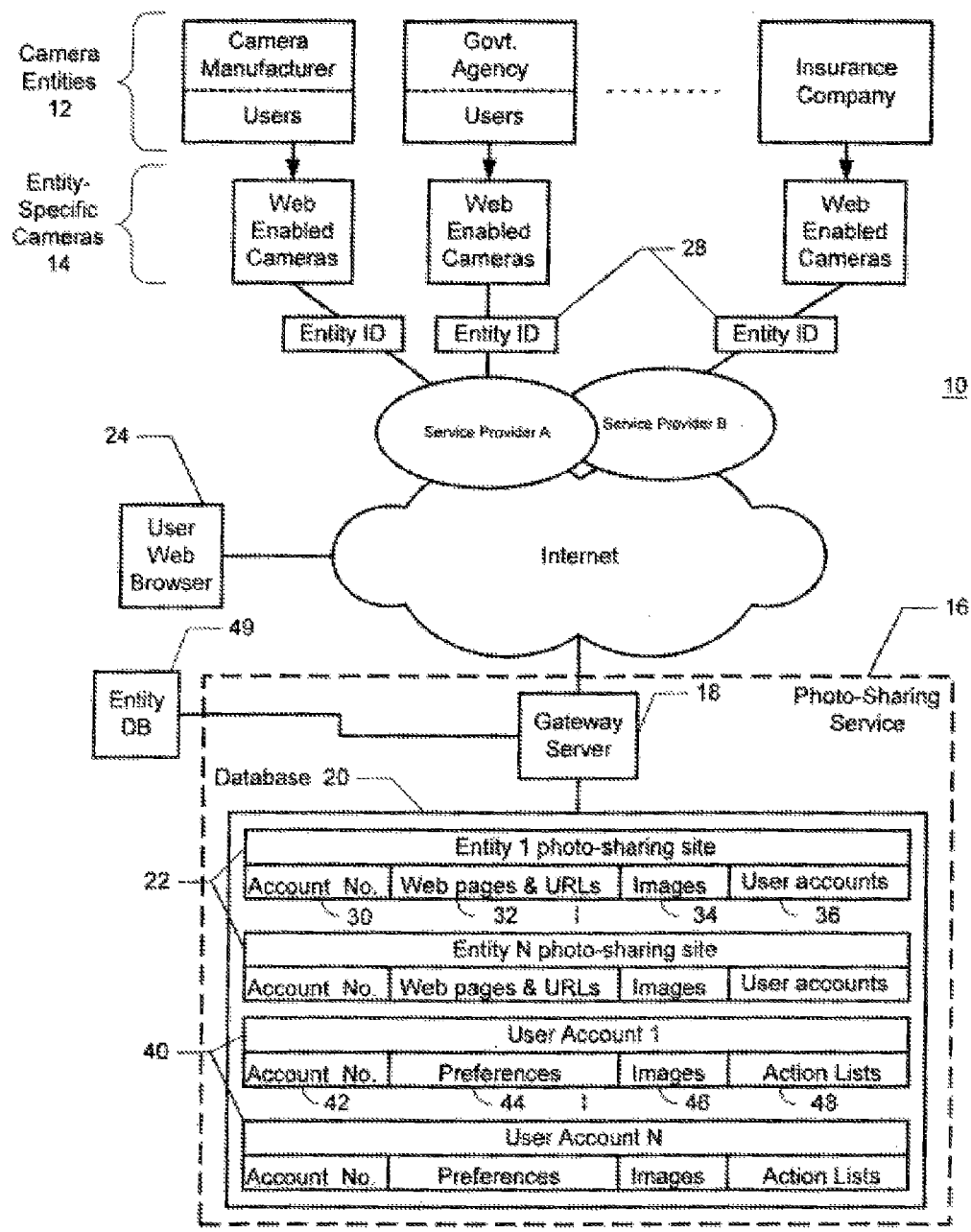
FIG. 1 is a block diagram illustrating an online photo-sharing system in accordance with a preferred embodiment of the present invention.

FIG. 1 is a block diagram illustrating an online photo-sharing system 10 in accordance with a preferred embodiment of the present invention. The system includes a plurality of camera controlling entities 12 that produce, own, or otherwise control a set of digital cameras 14, and an online photo-sharing service 16. The online photo-sharing service 16 includes a gateway server 18 and an entity/account database 20. The various camera controlling entities 12 contract with the photo-sharing service 16 to transparently host customized photo-sharing websites 22 for each entity, which are referred to herein as entity-specific photo-sharing websites 22. The entity-specific photo-sharing websites 22 are each accessible to the user through the entity's existing Internet site (not shown), and thus appear to users as though the entity-specific photo-sharing websites 22 are hosted by the corresponding entity. According to a preferred embodiment of the present invention, the cameras 14 for a particular entity are customized for that entity to create entity-specific cameras 14, such that when the cameras 14 connect to the Internet, the cameras 14 automatically upload their images to the photo-sharing website of the corresponding entity. In a further aspect of the present invention, the photo-sharing service 16 automatically stores the images in a web album, which is viewable over the Internet by a user's web browser 24.

As used herein, a camera controlling entity 12 is any entity that makes, owns, sells, or controls digital cameras 14, and therefore includes, camera manufactures, companies, retailers, and end-users. One or more combination of these entities 12 may either contract with the photo-sharing service 16 to provide entity-specific websites 22 for their cameras 14, or have entity information transmitted to the photo-sharing service 16 from the cameras 14. Therefore, a camera controlling entity 12 may include a single entity 12 or a hierarchal relationship of entities 12.

An example of a single entity 12 includes an insurance company that contracts with the photo-sharing service 16 to have all digital cameras 14 used by their agents to transmit their images to a customized insurance photo-sharing website. Examples of a hierarchal relationships of entities 12 includes a camera manufacturer, such as Nikon, that contracts with the photo-sharing service 16 to have all Nikon digital cameras 14 transmit their images to the customized Nikon photo-sharing website. Since the images of different users must be distinguished, each user of a Nikon camera 14 would also constitute an entity within the Nikon website so that the images from different users can be distinguished. Other examples of hierarchal entity relationships include a retailer and its consumers, a real estate agency and its agents, community groups and its members, and government agencies and its employees, for instance.

In a preferred embodiment, the cameras 14 are customized for their respective entities 12 by providing the cameras 14 with software for transmitting entity ID information 28 identifying its controlling entity 12 to the photo-sharing service 16. The photo-sharing service 16 in conjunction with the gateway server 18 and the entity/account database 20 hosts the entity-specific photo-sharing websites 22. Each entity-specific website 22 is identified in the database 20 by an entity account number 30 and includes the web pages and URLs 32 comprising the website, the images and web albums 34 stored on the website, and the user account numbers 36 of authorized users. The database 20 also includes user accounts 40, each of which comprises a user account number 42, user preferences 44, the user's images 46, and action lists 48, explained further below.

The gateway server 18, which communicates with the cameras 14 during image uploading, receives one or more entity IDs 28 from each camera 14 and matches the entity ID 28 with an entity account 30 in the database 20. The images are then automatically associated with the photo-sharing website 22 of the identified entity 12 and/or the identified user.

After the images are uploaded, a user of the camera 14 may visit the online photo-sharing website 22 over the Internet to view the images via a web browser 24. Since the photo-sharing websites 22 are transparently hosted by the photo-sharing service 16, each photo-sharing website 22 appears as though it is hosted by the entity itself, rather than the third party service.

In one embodiment, the cameras 14 may connect to the Internet via a service provider 26, which may include a wireless carrier and/or an Internet service provider (ISP) that is capable of servicing many devices simultaneously. In a preferred embodiment, each of the cameras 14 is provided with wireless connectivity for connecting to the Internet, and is therefore so called "web-enabled" devices, although a wired connection method may also be used.

The cameras 14 may be provided with wireless connectivity using anyone of a variety of methods. For example, a cellphone may be used to provide the digital camera 14 with wireless capability, where the camera 14 is connected to the cellphone via a cable or some short-range wireless communication, such as Bluetooth. Alternatively, the camera 14 could be provided with built-in cellphone-like wireless communication. In an alternative embodiment, the digital camera 14 is not wireless, but instead uses a modem for Internet connectivity. The modem could be external or internal. If external, the camera 14 could be coupled to modem via any of several communications means (e.g., USB, IEEE1394, infrared link, etc.). An internal modem could be implemented directly within the electronics of camera 14 (e.g., via a modem ASIC), or alternatively, as a software only modem executing on a processor within camera. As such, it should be appreciated that, at the hardware connectivity level, the Internet connection can take several forms. Hence, it should be appreciated that the present invention is not limited to any particular method of accessing the Internet.

In a preferred embodiment, the entity-specific websites 22 are customized to seamlessly integrate into the entity's existing website by following the look and feel of the entity's existing website. The entity-specific websites 22 are hosted on the photo-sharing service 16, but a link to the entity-specific websites 22 may be provided on the homepage of the corresponding entity's existing website. Thus, in order to view a web album on an entity-specific website 22, the user must visit the entity's existing website and click the link to the entity-specific website 22, where the user's browser 24 will be transparently directed to the photo-sharing service 16 and be provided with the web pages 32 of the entity-specific website 22.

As an example of the operation of the photo sharing system 10, consider the following scenario. Assume that Minolta and Nikon are entities 12 that have contracted with the photo-sharing service 16, and that the photo-sharing service 16 hosts a photo-sharing website 22 for Minolta and a photo-sharing website 22 for Nikon. The Minolta cameras 14 would be provided the entity ID 28 for Minolta and the Nikon cameras 14 would be provided the entity ID 28 for Nikon. When the Minolta and the Nikon cameras 14 send sets of images to the photo-sharing service 16, the gateway server 18 would distinguish the cameras 14 by the entity IDs 28 and would direct the set of images received from Minolta cameras 14 to Minolta's photo-sharing website, and would direct the images from Nikon cameras 14 to Nikon's photo-sharing website. To view the images, the owners of the cameras 14 would use a browser 24 on their PC or PDA to visit the URL of the Minolta or Nikon photo-sharing websites 22. In one preferred embodiment, the photo-sharing service 16 sends the URL of the entity-specific website 22 directly to the camera 14 for display to inform the user of the address.

According to the present invention, the photo-sharing service 16 provides business-to-business and business-to-consumer business models. The service is business-to-business because the service provides companies, such as camera manufactures, with a complete end-to-end solution for their cameras 14. The solution includes customized software for their cameras 14 for sending images over the internet, and an internet website for storing images from those cameras 14 on a branded website that appears to be hosted by the company. The service is business-to-consumer because it allows users of digital cameras 14 with an automatic solution for uploading captured images from a digital camera 14 to an online photo-sharing website, without a PC.

According to one preferred embodiment of the present invention, the photo-sharing service 16 provides a method of doing business whereby the photo-sharing service 16 shares revenue based on the hierarchal relationship of the entities 12. For example, if the photo sharing service 16 charges a fee for receiving and/or storing the images received from the entity-specific cameras 14, then the photo sharing service 16 may share a portion of the fee with the manufacturer and/or third party supplier of the camera 14 that uploaded the images, for instance. Revenue may also be shared with the wireless service provider providing the connection with the photo sharing service 16.

Figure 2:
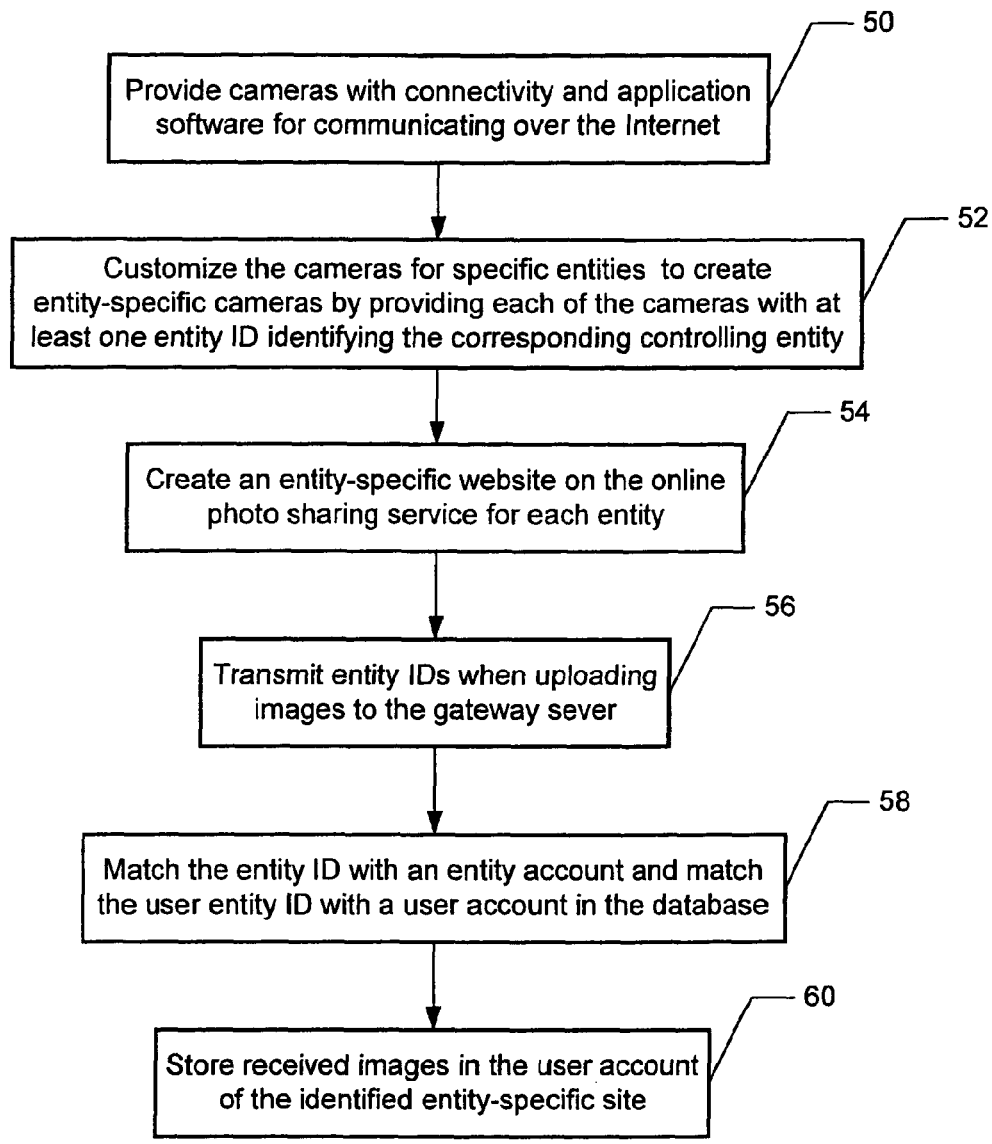
FIG. 2 is a flow chart illustrating a business method for hosting entity-specific photo-sharing websites for entity-specific image capture devices in accordance with a preferred embodiment of the present invention.

FIG. 2 is a flow chart illustrating a business method for hosting entity-specific photo-sharing websites for entity-specific image capture devices, such a digital cameras, in accordance with a preferred embodiment of the present invention. First, the cameras 14 are provided with connectivity and application software for communicating over the Internet in step 50. In a preferred embodiment, this step is performed during camera 14 manufacturing to provide off-the-shelf web enabled cameras 14. The cameras 14 are also customized for specific entities 12 to create entity-specific cameras 14 by providing each of the cameras 14 with at least one entity ID 28 identifying the corresponding controlling entity in step 52.

Figure 3:
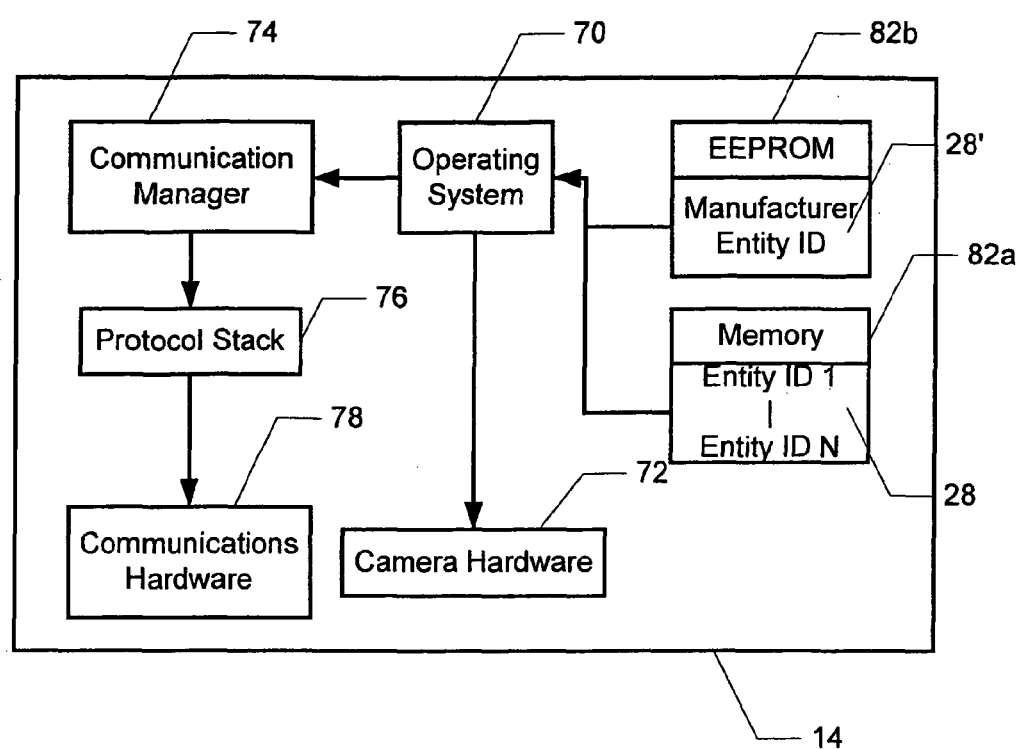
FIG. 3 is a diagram showing a preferred embodiment of the connectivity and application software of the camera.

Referring now to FIG. 3, a diagram showing the preferred embodiment of the connectivity and application software of the camera 14 and the entity ID 28 information is shown. Preferably, the camera 14 includes a microprocessor-based architecture that runs an operating system 70 for controlling camera hardware 72 and overall functionality of the camera 14 (e.g., taking pictures, storing pictures, and the like). An example of such an operating system 70 is the Digita™ Operating Environment developed by the assignee of the present application. The camera 14 also includes communication manager 74 software, and a TCP-IP protocol stack 76, that enables communication via the internet, as is well-known in the art. The entity ID information 28 and captured images may be stored in one or more types of memories 82.

For hierarchal entity relationships, the cameras 14 are provided with hierarchal entity IDs 28; one entity ID 28 identifying the entity, and a second entity ID 28 identifying the end-user. Whether there are one or more entity IDs 28, the entity ID 28' of the camera manufacturer may always be provided. Camera 14 customization may occur either during manufacture or anytime thereafter. In a preferred embodiment, the manufacturer entity ID 28' is provided at the time of manufacturing and is stored in an EEPROM 82b, while the entity IDs 28 for other entities 12, such as companies and end-users, are loaded into the camera 14 subsequent to manufacturing and are stored in flash memory 82a or the EEPROM 82b.

Customization that occurs subsequent to manufacture may be implemented using several methods. The first method is to manufacture the cameras 14 with an application programming interface (not shown) for accepting a subsequently loaded software application that specifies the entity IDs 28. The application may come preloaded on a flash card, which is then inserted into the camera 14 by the user and stored in flash memory 82a. The application may also be wirelessly beamed into the camera. When executed in the camera, the software application transmits the appropriate entity IDs 28 to the gateway server 18.

The second method is to load a small file in the camera 14 specifying the entity IDs 28 from a removable memory or from a PC, and storing the file in a system folder within the camera's flash memory 82a. The camera 14 then accesses the file when an Internet connection is established. In a preferred embodiment, the communication manager 74 automatically extracts the manufacturing ID 28' and the entity ID 28 and transmits them to the gateway server 18. In this embodiment, the entity ID 28 is also stored in the EEPROM 82b and is factory set to zero (empty). Thus, unless the entity ID 28 is set, the manufacturing ID 28' may default as the highest controlling entity.

If, for example, a third party developer X contracts to provide custom camera software for camera manufacturer Z, then a custom entity ID will be issued for developer X and developer X will place the custom entity ID into the EEPROM 82b. Developer X is now a controlling entity 12, and may specify to the photo-sharing service 16 that a developer X entity-specific photo-sharing site 22 or developer X's own website be the destination for the uploaded images.

The protocol stack 76, under direction of the communications manager interfaces with the communications hardware 78 of camera. The protocol stack 76 includes software APIs and protocol libraries that interface with the communication manager 74, and communication hardware interface drivers that interfaces directly with the various communications hardware 72 the camera 14 must function with (e.g., a Bluetooth transceiver, etc.). The communication manager 74 communicates with operating system 70 and the IP protocol stack 76 to establish an Internet connection and to transmit the entity ID 28 information and images from the memories 82a and 82b to the photo-sharing service 16.

In an alternative embodiment, rather than loading entity IDs 28 into the camera, a combination of the camera's serial number and the make and model number of the camera may be used as the entity ID 28. Entity specific cameras 14 may then be distinguished by providing a mapping of the camera serial numbers and product IDs to specific entities 12 in the database 20.

Although the camera 14 has been described in terms of a software-based customization solution, those with ordinary skill in the art will readily recognize that the camera 14 may also be provided with a hardware-based solution.

Referring again to FIG. 2, before or after camera customization, the entity-specific websites 22 are created for each entity contracting with the photo-sharing service 16 in step 54. Customization requires storage of entity information in the entity/account database 20 and creating and storing web page elements comprising the entity-specific photo-sharing website in the database 20. The entity-specific information stored in the database 20 may also include service levels, and enabled features for the entity-specific website 22. Features are components or services that may be provided on websites by the photo-sharing service 16, such as search functions, and online printing, for instance, but may be selectable by each entity for its own website. As an example, company X may provide customized cameras 14 for its employees, but may not wish to allow employees to print images from the company X photo website for security reasons. If so desired, company X may have the photo service disable this feature from their particular website.

In a preferred embodiment, the entity-specific websites 22 are not created from scratch, but are created by modifying a preexisting template. The template may include several different sections, such as A, B, C and D, for instance. Assuming for example that the template used to create a website for Nikon, and section A is used to specify the name of the entity then the name Nikon would be inserted into that section. Other entity-specific content would be used to fill out the remaining sections. The Web pages comprising the Nikon specific photo-sharing website would then be provided with URLs unique to that website. The entity's regular website would be modified to include a link to the entity's photo-sharing website 22. In addition, the entity-specific photo-sharing website would include a link back to the entity's website. Entities 12 may have entity photo-sharing websites 22 created for them in one of two ways; automatically by logging into the photo-sharing service 16 and manually customizing the templates, or by having the entity photo-sharing website created for them.

Referring still to FIG. 2, when a camera 14 establishes an internet connection with the gateway server 18, the camera 14 transmits its entity IDs 28 and/or user entity ID 28 when uploading user selected images to the gateway server 18 in step 56. In response, the gateway server 18 matches the entity ID 28 with an entity account in the database 20 and matches the user entity ID 28 with a user account 40 in the database 20 in step 58. The images received are then stored in the user account 40 of the identified entity-specific website 22 in step 60.

Referring again to FIG. 1, each user account 40 in the database 20 may also include one or more action lists 48. According to the present invention, an action list 48 includes one or more items representing actions that the gateway server 18 should take with respect to uploaded images, such as where to store and/or send the images from a particular user or camera, for instance. As explained further below, the action list 48 stored on the database 20 under a user's account 40 are automatically downloaded to the user's camera 14 during a connection with the gateway server 18 and stored on the camera 14. When the user initiates an image upload, the action list 48 is displayed to the user so the user may easily select what actions the gateway server 18 should take with respect to the images by selecting the displayed action list items.

Examples of action list items include specifying that the uploaded images should be stored on the entity-specific photo website, sending the images to a list of email addresses, or even performing some type of analysis or calculation on the image data, for instance.

In a further aspect of the present invention, an action list item is not limited to instructing the gateway server 18 to perform actions only within the photo-sharing service 16. Rather, an item in the action list 48 may also instruct the gateway server 18 to perform actions outside of the photo-sharing service 16, such as storing the images in an external database 49 of the entity 12. For instance, in the example where the entity 12 is a company, some users of the company's cameras 14 could have action lists 48 instructing the gateway server 18 to store uploaded images to the company's database, rather than to the company's photo-sharing site 22. Based on the action lists 48 and customization, the gateway server 18 may be programmed to automatically perform predefined tasks, such as creating new web albums, or a new page within an existing album, parse the images to extract sound files or other metadata, print images and mail them to designated addresses, and so on.

In a preferred embodiment, the action lists 48 may be created via several methods. In one method, the action list is created by the photo-sharing service 16 the first time the user's camera establishes a connection. That is, a default action list 48 is automatically created based on the entity ID when a user account 40 is first created. In a hierarchal entity relationship where the entity 12 is a company, a default action list 48 may be created to implement a workflow specified by the entity 12. In a hierarchal relationship where the entity 12 is camera manufacturer, for instance, a default action list 48 may be created instructing the gateway sever 18 to store the user's images in a simulated "shoebox" on the entity-specific photo-sharing site 20. The user may then go online and create albums from the images in the shoebox as desired.

Another method is for the user to create the action list 48 online on the entity-specific photo-sharing site 20. The action list 48 may be created manually on the website 20 by the user navigating to the site 20 using a web browser 24, accessing her account, and manually creating the action list 48 or editing the action list 48 on the entity-specific site 22. The action list 48 may also be created automatically on the website 20 in response to user actions performed on the website, such as printing images, or creating a web album. Alternatively, after performing an action, the user may be prompted whether they would like this action added to his or her action list 48. If so, the user clicks a check-box and the item is added the action list 48. In a preferred embodiment, any action list 48 created and edited on the photo-sharing site 20 are downloaded to the camera every time the camera 14 connects to the photo-sharing service 16 and made available for user selection on the camera 14 during the next upload.

Yet another method for creating an action list 48 is to allow the user to create the action list on the camera 14. The user may manually create an action list 48 by "typing" in pre-defined items on the camera. The user may also type in an email address as an action list item whereby when that item is selected, the uploaded images are stored as a web album on the entity-specific photo-sharing website 22 and the server 18 sends a notification to the specified recipient containing the URL to the web album page.

A method and system for hosting web-based photo-sharing websites and for customizing digital cameras to upload images to the entity-specific photo-sharing websites has been disclosed. According to the present invention, users of the customized cameras 14 can upload images to the Internet for storage and web photo album creation without the use of a PC.

In one embodiment described above, the present invention assumes that an ISP account has been established with the digital camera's service provider, and that users of cameras 14 belonging to a certain entity 12 may use the cameras 14 to upload images to the website of the entity 12. However, two problems with account setup remain. One problem is that just as with a PC and PDA, the user must first establish an ISP account before the camera 14 can establish Internet communication. The second account problem is that most websites, including the photo sharing sites 22, may require each user to establish a unique account before using the site to distinguish one user from another. Before being able to connect the web-enabled camera 14 to the Internet, the user must establish these two accounts by either entering account setup information on a PC or entering account setup information on the camera 14. Neither alternative is a convenient alternative for people who do not have the time nor inclination to do so.

In a further aspect of the present invention, the cameras and the photo sharing site are provided with software for automatically creating Internet and photo-sharing website accounts for each camera 14 upon first use, without requiring the user to first enter account information on a PC or on the camera 14.

Figure 4A:
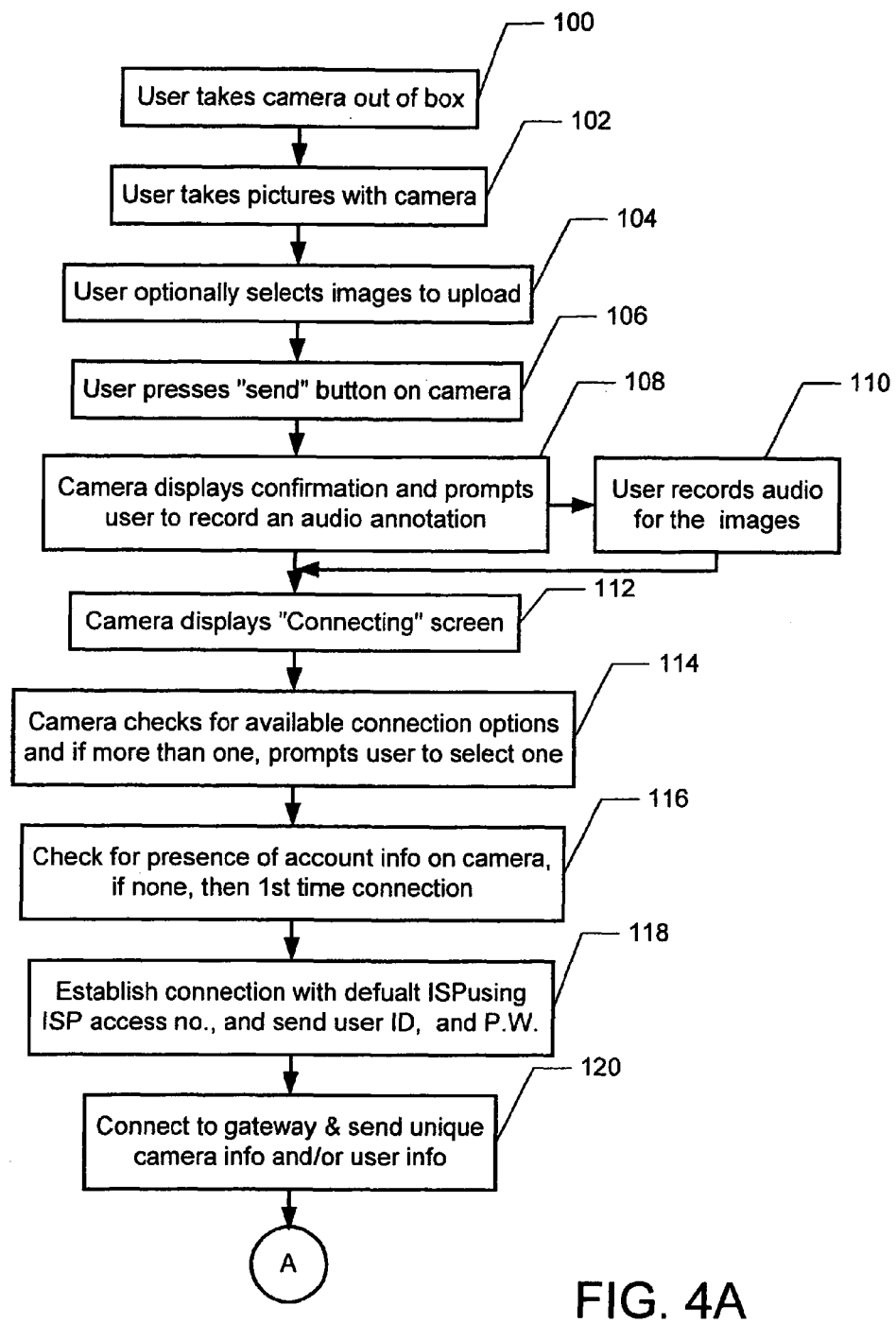
FIGS. 4A and 4B illustrate a flow chart of a process for automatically configuring a web-enabled digital camera to access the Internet in a preferred embodiment of the present invention.
Figure 4B:
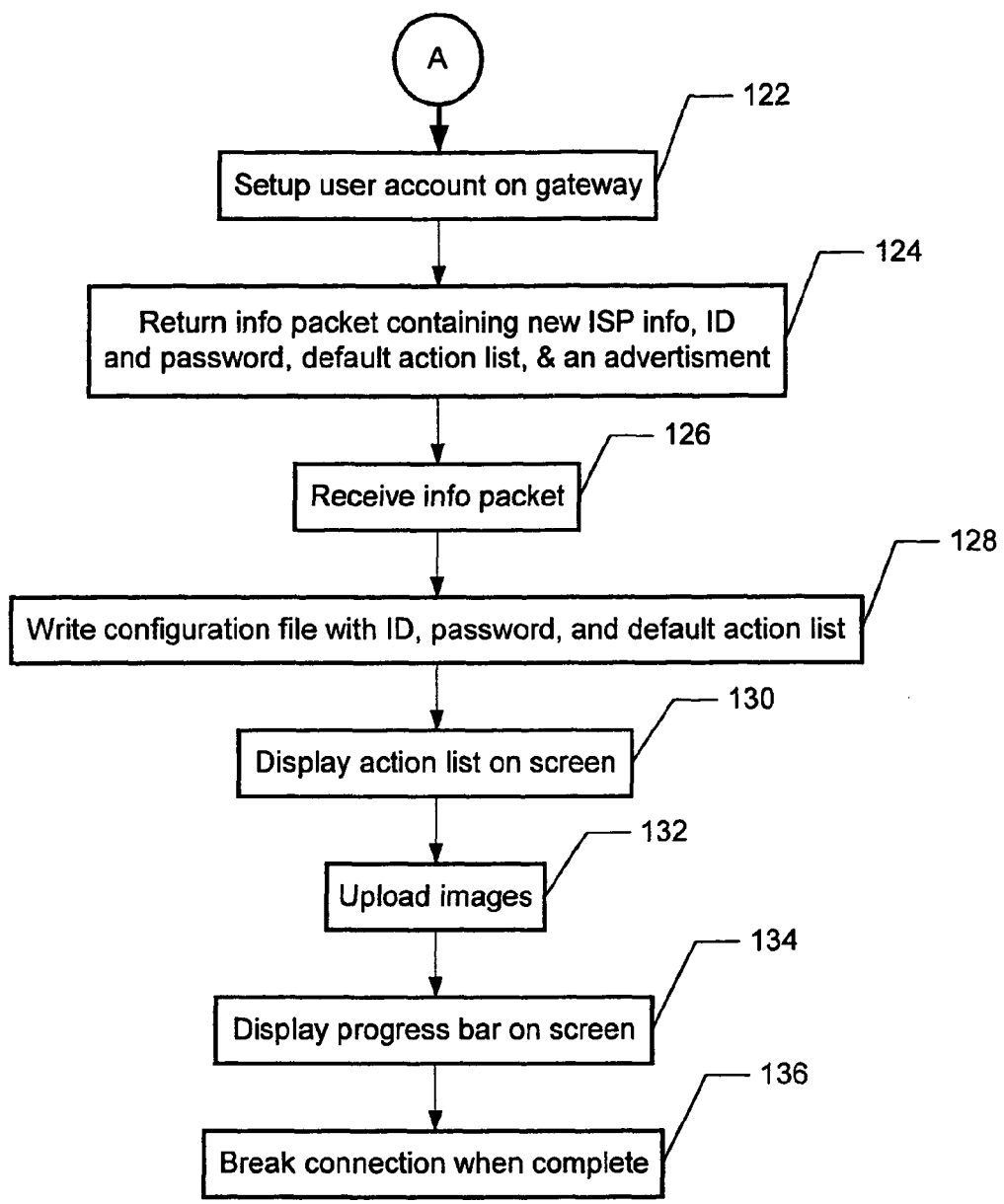

Referring now to FIGS. 4A and 4B, a flow chart illustrating a process for automatically configuring a web-enabled digital camera to access the Internet in a preferred embodiment of the present invention. Although the process will be described in terms of automatically establishing Internet accounts for a digital camera without requiring the user to enter information, those with ordinary skill in the art will readily recognize that the present invention may be used to automatically establish Internet accounts for any type of portable electronic device.

The process assumes that a user has just acquired a digital camera 14 customized as described above, and has just taken the camera 14 out of its box in step 100. After taking pictures with the camera in step 102, the user may review the images in the camera's liquid crystal display (LCD) screen and optionally select a set of images to upload to the photo sharing service 16 in step 104. The user then presses a "send" button on the camera in step 106 to upload the images.

In response, the camera displays a confirmation dialog screen on the camera and prompts the user to record an audio annotation for the images or to continue in step 108. The user may then choose to record audio for the images in step 110. After choosing to continue, or after recording audio, the camera displays a "connecting" dialog screen in step 112 to indicate to the user that the camera is establishing an Internet connection. At the same time, the camera checks for available connection options in step 114, and if more than one is found, the camera prompts the user to select one of the connection options. For example, the camera may be within range of a Bluetooth-equipped printer and a cellphone, so the user will be prompted to choose which device the camera should establish communication with.

The camera then checks for the presence of account information on the camera in step 116, and if there are none, the camera assumes that this is a first-time connection. According to the present invention, in order to allow the camera to make a first-time Internet connection, the camera is provided with default Internet service provider (ISP) information during manufacturing, including an ISP access number, and user ID and password (if required). The camera establishes connection with the default ISP in step 118 by dialing the preloaded access number, and by sending the preloaded user ID and password to the ISP. This special account may be configured so that the camera can only connect to the gateway server 18 (no other IP addresses may be allowed).

After connecting with the ISP, the camera connects to the gateway server 18 and sends unique camera information and/or user information in step 120. In a preferred embodiment of the present invention, a combination of the camera's serial number and the make and model number of the camera may be sent as the unique camera information. In another preferred embodiment, the user's e-mail address may be sent as the unique camera or user information.

Continuing with FIG. 4B, the gateway server 18 uses the unique camera information to set up a user account 40 in step 122. After creating the user account 40, the gateway server 18 returns an information packet to the camera containing new ISP information (if needed), an account ID, and an account password in step 124. The information packet may also contain a default action list specifying what actions should be taken with respect to the images, an advertisement for display on the camera, and the URL of the entity-specific website 22.

It should be noted that if the camera is used in conjunction with an internet protocol (IP) direct phone or is provided with a phone number for connected to a dedicated server where the user is not billed separately for the ISP connection, then the steps of providing the camera with default ISP info and returning new ISP info, may be omitted.

The camera receives the information packet in step 126, and writes a configuration file to memory 82a containing the ID, password, and default action list in step 128. The camera then displays the action list on the camera's LCD screen for selection by the user in step 130. The camera may optionally display the user's account information as well.

In an alternative preferred embodiment where security is a concern, the camera 14 first logs off the special ISP and the gateway accounts, and then reconnects using new ISP and gateway accounts in order to retrieve the action lists 48.

Figure 5:
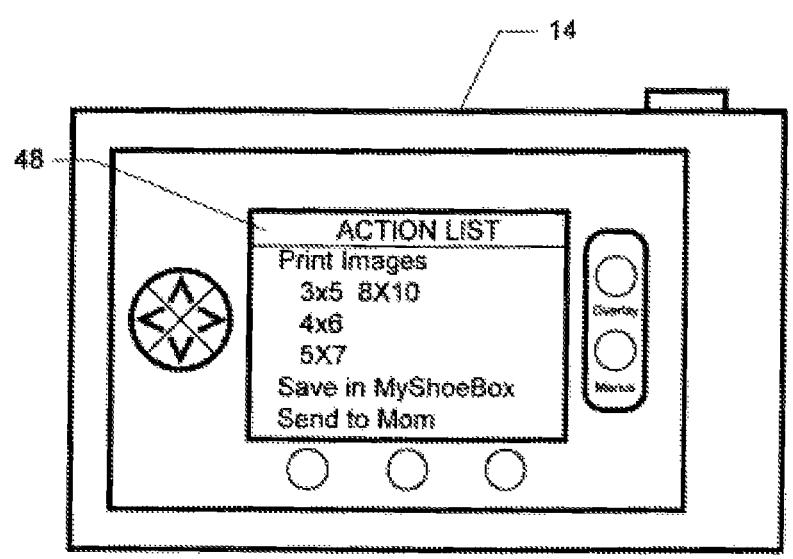
FIG. 5 is a block diagram illustrating an example action list 48 displayed on the LCD screen of the camera.

FIG. 5 is a block diagram illustrating an example action list 48 displayed on the LCD screen of the camera 14. The action list 48 is shown displaying three major options; printing the uploaded images, saving the uploaded images in the user's shoebox, and sending the images to Mom. Under the printing option, the user may select from various size prints. Rather than nested menu categories as shown under the printing option, the action list 48 may be displayed with each action listed as a separate item (e.g., "Send 4×8 prints to Mom", "Send 5×7 prints to me").

Referring again to FIG. 4B, after the user selects one or more actions from the action list 48, the camera begins to upload the images along with the selected actions in step 132 and displays a progress bar on the screen in step 134. In one preferred embodiment, the camera may also display the advertisement sent in the information packet from the gateway server 18. The advertisement may advertise the controlling entity 12, the entity's photo-sharing site 22, or the photo sharing service 16. After all the images are uploaded and associated with the user's account 40, the camera breaks the connection with the gateway server in step 136. At this point, the camera 14 may also display the URL of the entity-specific website 22 to the user.

The next time the user uploads images, the camera will use any new ISP information received to connect to the Internet and will use the account ID and password written to memory 82a when connecting to the gateway server 18. Thus, by using unique camera information, such as the serial number, to establish a web site account upon first use, the present invention eliminates the need for the user to type in information to establish a web site accounts.

To further explain the present invention from a user interaction point of view, consider the following scenario where a user named Jack has just purchased a digital camera 14 from a store and unpacks the camera from the box. There is a "Quick Start Guide" which guides him in getting started. Jack pops in the batteries, sets the date and time, and takes some pictures of his dog and his new baby. Jack can see the pictures have come out well on the small LCD, and now wants to try sharing them with his parents.

The Quick Start Guide says to select the photos to be sent using the "Select" button, and then press the "Send" button. So, Jack navigates to each of the baby pictures, selects them, and then presses the "Send" button. Instantly, a dialog comes up on the LCD screen: "No Receiving Device Found! Please turn on your phone or other connecting device." Oops! Jack pulls out his cell phone, and turns it on. He presses the "Continue" button. Jack does not see this happen, but the camera now "discovers" the cell phone, and immediately presents another dialog: "4 Images Selected. Press Record to add a Sound Note, or Continue to send". Although Jack finds the proposition of recording sound intriguing, he decides to skip it and presses the "Continue" button. Immediately, the dialog is replaced with a "Connecting . . . " dialog.

Shortly, another dialog appears: "Your camera serial number is 38147. Please write this down. You will need it to access your web photo albums". Jack writes the number down on the spot provided in the Quick Start Guide, and presses OK.

Another "Connecting . . . " dialog appears, and is then quickly replaced by another dialog, which says "A free, temporary account has been set up for you at www.photo-sharing service.com/new_accounts. You will need your camera serial number to access your photos and complete the setup of your account. Please complete the account setup within 30 days". Jack writes down the URL in the space provided in the Quick Start Guide, and presses the OK button. Jack doesn't know it, but during this dialog, the camera has begun transmitting his images and is already partially complete.

A new dialog comes up, with a progress bar. Jack is surprised to see that the transmission is already almost ⅓ done. Below the progress bar, the dialog says "Press "Continue" to use camera during photo transmission, or wait for progress bar to complete". Jack is interested in watching how fast his images are transmitted, and decides to watch the progress bar complete. A "Transmission Successful" dialog appears. Jack presses the OK button. The camera returns to the review mode.

Jack is pretty excited—he just sent four baby pictures to the Internet. Jack then decides to see what happened to his images so he turns on his PC. After connecting to the Internet, Jack types in the URL from the Quick Start Guide. A Photo-sharing service web page appears, welcoming Jack to the photo-sharing service. After looking briefly at the welcome page, Jack types in his serial number from the Quick Start Guide, and selects his camera's model number from a pop-up menu. Jack clicks on a "Submit" button on the web page.

Jack now sees a page which shows thumbnails of the baby pictures he just sent, the page is entitled "My Shoebox". The page explains to Jack that he is looking at his on-line digital photo shoebox. Since the server 18 knows this is Jack's first visit, special help messages may appear. Various options are provided via buttons and text links. One that catches Jack's eye is CREATE WEB PHOTO ALBUM. Jack clicks this button, and works his way through the process of setting up an on-line photo album. This includes selecting photos from the shoebox, as well as selecting layout and style. One of the check-box items Jack is offered is "Make this album a camera Action List Item". Jack doesn't know what that is, so he clicks the Action List link, which brings up a brief description "If you check this box, you will be able to send pictures directly from the camera to this photo album!" Jack finds this interesting, so he closes the description window, and checks the box. Jack also enters the email address for his parents and his wife's parents, so they can be notified to come and see his photo album, which he has entitled "Our First Baby".

One of the buttons Jack does not click is the "Complete Account Setup" button. He knows that he has 30 days to do that chore, and figures he will get back to it later.

Jack's wife arrives home from shopping at this point, and Jack wants to show her how the new camera works. He starts by showing her the baby album on the PC, then decides to take some pictures of them holding the baby. Jack then selects the images, and presses the "Send" button again.

Since his cell phone is still on, sitting on the table a few feet away, the connection goes smoothly and quickly. A new dialog pops up, surprising Jack. It says "Select the destination for your pictures" and offers two choices: "My Shoebox" and "Our First Baby". Jack is amazed, he doesn't realize that the server 18 downloaded his action list to his camera during the connection. Jack decides to select the "Our First Baby" web album as the destination for the images, and clicks OK. The pictures are sent as before. After the transmission has completed, Jack goes to the PC to check on the photo album. When Jack refreshes the album page, he now sees the additional pictures he just sent, along with the pictures he sent before.

Jack spots a "Send Prints" link on the web page, and clicks it. He is led through a selection of print types, mailing addresses, and credit card info to make it possible to send prints. He is offered the option of completing the setup of his account. Jack decides to do that now, and proceeds to fill out the requested information, including his credit card number. Once the account setup is complete, Jack continues the print order. One of the radio button items is "Make prints a separate Action List Item" or "Make prints part of your Action List". Jack remembers something about Action Lists from before, but is not sure what this means. The description says "Making a separate action list for prints allows you to decide in the camera to send to the photo album and send prints or to just send to the photo album." Jack thinks this is cool, and checks the "Make prints a separate Action List" item. The next time Jack sends photos from the camera, his action list will be updated to present three choices: My Shoebox, Our First Baby, and Our First Baby w/Prints.

The underlying technology supporting this scenario are summarized below. Other functions and features are assumed, but not required for this scenario:
 1. Two-way connection between camera and portal
 2. Camera metadata included in the request
 3. If not using an IP direct connection,
  3.1. Default ISP connection info built into the camera for the first connection (country specific)
  3.2. Downloaded assigned ISP information from the portal to the camera
 4. Software capable of recognizing automatically a set of supported phones and adjusting the protocol to match 5. Action Lists maintained on the server that are automatically downloaded to the camera to update the camera selection list each time a connection is made
6. An On-line shoebox
7. Ability to download files to the camera from the server. The files could be text, graphics interchange format (GIF), animated GIF, joint photograph experts group (JPG), or even a script or applet. This feature enables the ability to display advertisements on the camera, remind the user of remaining time to complete account setup, make special offers, and indicate limits reached.

A method and system for automatically configuring a web-enabled digital camera to access the Internet has been disclosed. Although the present invention has been described in accordance with the embodiments shown, one of ordinary skill in the art will readily recognize that there could be variations to the embodiments and those variations would be within the spirit and scope of the present invention. For example, although the photo-sharing service has been described as including the gateway server and the database, the database may be located elsewhere. Also, the gateway server may be used to control account information, while one or more other servers may be used to provide the web pages of the entity-specific websites. Accordingly, many modifications may be made by one of ordinary skill in the art without departing from the spirit and scope of the appended claims.

What is claimed is:

1. A method for configuring an imaging device, comprising:
    automatically transmitting, by the imaging device, information uniquely identifying the imaging device to at least one server to enable the at least one server to at least partially set up a user account to access a website on a public network based on the information;
    receiving, via the imaging device, user account information associated with the at least partially set-up user account from the at least one server; and
    storing the user account information on the imaging device;
    wherein the imaging device is configured to use the stored account information to establish a connection with the public network or to complete set up of the user account a next time the imaging device connects to the at least one server; and
    wherein the imaging device is configured to establish a connection with the at least one server using wireless communication.

2. The method of claim 1, wherein the wireless communication comprises cellular wireless communication.

3. The method of claim 2, wherein the imaging device further comprises a cell phone.

4. The method of claim 3, wherein the information comprises at least a partial serial number configured to uniquely identify the imaging device.

5. The method of claim 4, further comprising providing the imaging device with a default Information Service Provider (ISP) access number, user ID, or password.

6. The method of claim 2, wherein the imaging device is further configured to upload images to the at least one server.

7. The method of claim 6, further comprising:
    providing the imaging device with default Information Service Provider (ISP) information; and
    establishing a connection to an ISP using the default ISP information.

8. The method of claim 7, further comprising terminating the connection with the ISP when the imaging device completes uploading the images to the at least one server.

9. An imaging device, comprising:
    a memory device configured to store instructions; and
    a processing device configured to execute the instructions stored in the memory device to:
        establish a connection to at least one server using wireless communication;
        automatically transmit identification information uniquely identifying the imaging device to the at least one server to enable the at least one server to at least partially set up an account to access a website on a network based on the identification information;
        store account information associated with the at least partially set up account received from the at least one server on the memory device; and
        in response to the at least one server having completed set up of the account, establish at least one connection to the network using the account information stored in the memory device, otherwise complete set up of the account a next time the imaging device connects to the at least one server.

10. The imaging device of claim 9, wherein the wireless communication comprises cellular wireless communication.

11. The imaging device of claim 9, further comprising a cell phone.

12. The imaging device of claim 11, wherein the identification information comprises at least a partial serial number uniquely identifying the imaging device.

13. The imaging device of claim 11,
    wherein the processing device is further configured to upload images to the at least one server.

14. The imaging device of claim 13, wherein the processing device is further configured to establish a connection to an Information Service Provider (ISP) using default ISP information stored in the memory device.

15. The imaging device of claim 14, wherein the processing device is further configured to terminate the connection with the ISP in response to completing upload of the images to the at least one server.

16. The imaging device of claim 14, wherein the default ISP information comprises a default ISP access number, user ID, or password.

* * * * *

UNITED STATES PATENT AND TRADEMARK OFFICE
CERTIFICATE OF CORRECTION

PATENT NO. : 8,572,663 B2
APPLICATION NO. : 13/183566
DATED : October 29, 2013
INVENTOR(S) : Anderson et al.

Page 1 of 1

It is certified that error appears in the above-identified patent and that said Letters Patent is hereby corrected as shown below:

On the Title Page, in Item (56), under "FOREIGN PATENT DOCUMENTS", in Column 2, Line 2, delete "EP 0930770 7/1999".

On Title Page 2, in Item (56), under "FOREIGN PATENT DOCUMENTS", in Column 2, Line 3, delete "WO 9921336 4/1999".

On Title Page 2, in Item (56), under "FOREIGN PATENT DOCUMENTS", in Column 2, Line 5, delete "WO 9948276 9/1999".

On Title Page 3, in Item (56), under "OTHER PUBLICATIONS", in Column 1, Line 3, delete "Canon Inc.)" and insert -- (Canon Inc.) --, therefor.

In the Specification:

In Column 1, Line 36, delete "restrictive" and insert -- and restrictive --, therefor.

In Column 5, Line 58, delete "such a" and insert -- such as --, therefor.

In Column 6, Line 65, delete "hardware 72" and insert -- hardware 78 --, therefor.

In the Claims:

In Column 13, Line 50, in Claim 3, delete "claim 2," and insert -- claim 1, --, therefor.

In Column 14, Line 4, in Claim 6, delete "claim 2," and insert -- claim 1, --, therefor.

Signed and Sealed this
Twenty-seventh Day of May, 2014

Michelle K. Lee
*Deputy Director of the United States Patent and Trademark Office*